US011665541B2

(12) United States Patent
Da Silveira, Jr.

(10) Patent No.: US 11,665,541 B2
(45) Date of Patent: May 30, 2023

(54) 5G ZERO CLIENT MONITOR

(71) Applicant: EMC IP Holding Company LLC, Hopkinton, MA (US)

(72) Inventor: Jaumir Valença Da Silveira, Jr., Rio de Janeiro (BR)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 9 days.

(21) Appl. No.: 17/355,353

(22) Filed: Jun. 23, 2021

(65) Prior Publication Data

US 2022/0417745 A1   Dec. 29, 2022

(51) Int. Cl.
 H04W 12/06   (2021.01)
 H04B 7/155   (2006.01)
 H04W 12/42   (2021.01)
 G06F 3/14    (2006.01)

(52) U.S. Cl.
 CPC .............. *H04W 12/06* (2013.01); *G06F 3/14* (2013.01); *H04B 7/15528* (2013.01); *H04W 12/42* (2021.01)

(58) Field of Classification Search
 CPC ......... H04W 12/06; H04W 12/42; G06F 3/14; H04B 7/15528

USPC ......................................................... 455/411
See application file for complete search history.

(56) References Cited

U.S. PATENT DOCUMENTS

| 10,909,830 | B1 * | 2/2021 | Stapleford | .............. H04W 4/90 |
| 2011/0126198 | A1 * | 5/2011 | Vilke | ...................... H04L 67/01 |
| | | | | 709/227 |
| 2021/0143885 | A1 * | 5/2021 | Grobmann | ........... H04B 7/0626 |

FOREIGN PATENT DOCUMENTS

KR   20210087701 A   *   1/2020

* cited by examiner

*Primary Examiner* — Tanmay K Shah
(74) *Attorney, Agent, or Firm* — Chamberlain, Hrdlicka, White, Williams & Aughtry

(57) ABSTRACT

A monitor includes a casing with a display, a display controller disposed within the casing and that controls the display, a processor disposed within the casing that controls the display and communicates with a fifth generation (5G) network, a 5G antenna that connects the monitor to the 5G network, and a switch that switches the processor between an activated state and a deactivated state. The monitor is a zero-client system when the processor is in the activated state and a plain display when the processor is in the deactivated state.

10 Claims, 3 Drawing Sheets

5G ZERO CLIENT MONITOR

BACKGROUND

A communication system may enable user equipment (UE) to communicate with a network in order to access a virtual environment. The communication system may include devices that relay information from the virtual environment to the UE.

SUMMARY

In general, certain embodiments described herein relate to a monitor including a casing with a display, a display controller disposed within the casing and that controls the display, a processor disposed within the casing that controls the display and communicates with a fifth generation (5G) network, a 5G antenna that connects the monitor to the 5G network, and a switch that switches the processor between an activated state and a deactivated state. The monitor is a zero-client system when the processor is in the activated state and a plain monitor when the processor is in the deactivated state.

In general, certain embodiments described herein relate to a method for operating a monitor. The method includes: switching, by operating a switch on the monitor, a processor of the monitor between a deactivated state and an activated state; causing, by the processor and in response to being switched to the activated state, an authentication chip of the monitor to authenticate the monitor with a fifth generation (5G) network; receiving, by the processor through a modem connected to a 5G antenna, instructions to display a virtual machine login on the monitor; and causing, by the processor and using the instructions, a display controller of the monitor to display the virtual machine login on a display of the monitor. The monitor is a zero-client system when the processor is in the activated state and a plain monitor when the processor is in the deactivated state.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures.

In the below description, numerous details are set forth as examples of embodiments described herein. It will be understood by those skilled in the art, that have the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components.

Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments described herein relate to a zero client monitor and a method for operating the zero client monitor.

Figure 1:
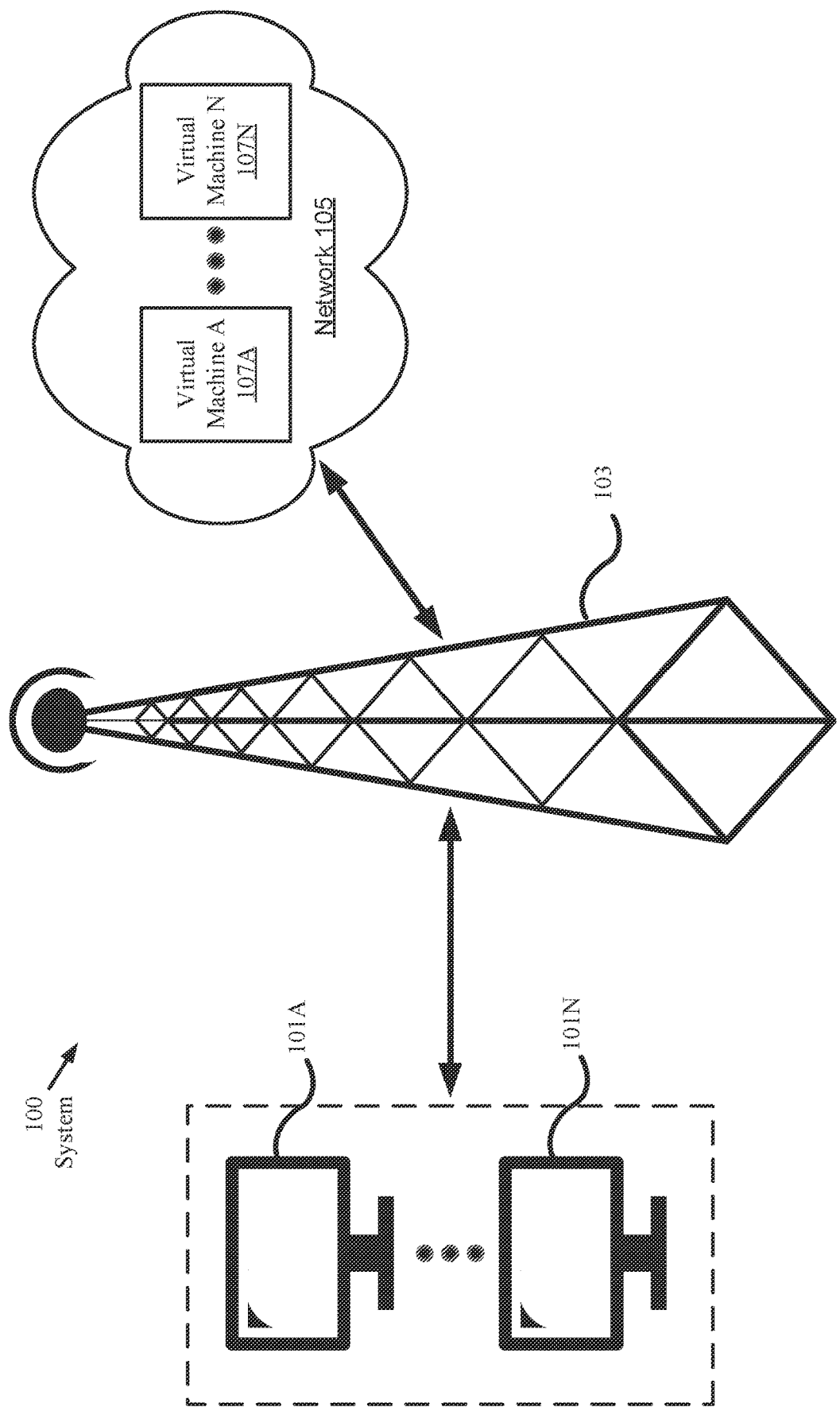
FIG. 1 shows a diagram of a system in accordance with one or more embodiments of the invention.

FIG. 1 shows a system (100) in accordance with one or more embodiments. As shown in FIG. 1, the system (100) includes a plurality of user equipment (UEs) (101A, 101N), a base station (103) connected to a network (105), and a plurality of virtual machines (107A, 107N) operating on the network (105). The plurality of UEs (101A, 101N) may be a zero client monitor (discussed in more detail below in FIG. 2) in communication with the base station (103) in order to access the functions of the virtual machines (107A, 107N) on the network (105).

In one or more embodiments disclosed herein, the network (105) is a fifth generation (5G) mobile telecommunications technology network and the base station (103) may be any type of base station configured for the 5G network. The base station (103) may operate as an edge station of the 5G network, and the network may be operated by a provider of telecommunication services (i.e., a Telco). Alternatively, the network (105) may be operated by a private entity.

The virtual machines (107A, 107N) may be any type of virtualization/emulation of a computer system being executed on any type of computer device (e.g., a server, a personal laptop, a desktop computer, etc.) in communication with the network. The UEs (101A, 101N) may access the functionalities and computing resources of the virtual machines (107A, 107N) through connection to the network (105) via the base station (103).

For example, each of the UEs (101A, 101N) may directly operate one of the virtual machines (107A, 107N), e.g., send commands to one of the virtual machines (107A, 107N) in a virtualized environment. The commands may be sent through one or more peripheral devices (not shown) (e.g., a mouse, a keyboard, a microphone, etc.) connected to one of the UEs (101A, 101N). In response to receiving these commands, the virtual machines (107A, 107N) send instructions to the UEs (101A, 101N) to display computer operations (e.g., the maneuvering of a browser, the operation of specific programs and/or applications stored in the virtual machines (107A, 107N), etc.) on a display screen of the UEs (e.g., 101A, 101N). In such a scenario, the UEs (101A, 101N) may operate as terminals for accessing and operating the virtual machines (107A, 107N) as a stand-alone remote computer without the need for specific external hardware (e.g., wireless routers, switches, Ethernet cables, etc.) necessary to connect the UEs (101A, 101N) to the network (105).

Figure 2:
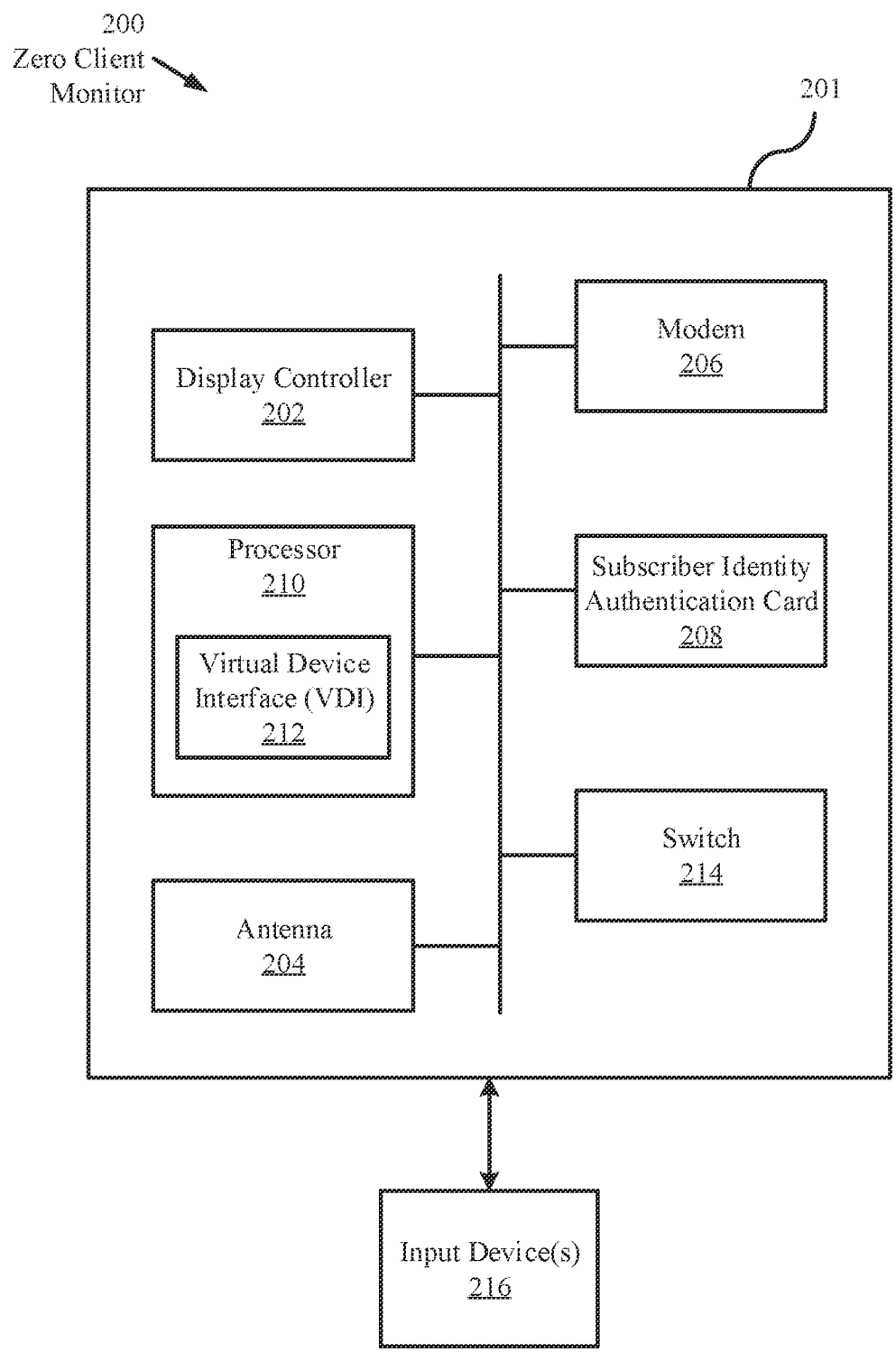
FIG. 2 shows a diagram of a zero client monitor in accordance with one or more embodiments of the invention.

FIG. 2 shows a zero client monitor (200) in accordance with one or more embodiments. As discussed above, the zero client monitor (200) may be one or more of the UEs (101A, 101N) operating in the system (100) shown in FIG. 1. In the context of this disclosure, the term "zero client" refers to a computing device with no local storage and operating system. Said another way, a zero client device is a computing device that relies on a server (e.g., the virtual machines (107A, 107N) of FIG. 1) to handle many functions that a traditional computer would normally handle using its own hardware and software.

As shown in FIG. 2, in one or more embodiments disclosed herein, the zero client monitor (200) includes a casing (201), a display controller (202), an antenna (204), a modem (206), a subscriber identity authentication card (208), a processor (210), a switch (214), and input devices (216). The monitor (200) may also include a power source (not shown). Each of these components of the zero client monitor (200) is discussed below.

In one or more embodiments disclosed herein, the casing (201) may be a housing that encloses and protects each of the other components discussed above excluding the input device(s) (216). For example, the casing (201) may be any type of display monitor (e.g., television monitor, computer monitor, etc.) casing that can be fitted with a display screen.

The casing (201) may also include the display screen (e.g., an LCD, LED, OLED screen, etc.). The display screen may be a normal display screen configured only to display an image or a touch screen configured to accept inputs (e.g., user commands) from a user through tactile (e.g., resistive and/or capacitive) feedback. In one or more embodiments disclosed, the casing (201) may include an integrated stand that allows the casing (201) to be propped up on a level surface. Alternatively, the stand may be a separate and distinct component that can be assembled onto the casing (201).

In one or more embodiments disclosed herein, the display controller (202) may be any combination of hardware devices including circuitry that enables the client monitor (200) to operate solely as a plain monitor. As a non-limiting example, the display controller (202) may be a stripped-down graphics card without any external slots for connecting to a peripheral device (e.g., another display).

In the context of this disclosure, a plain monitor is a display monitor adapted solely to display an image received from an external source. If the zero client monitor (200) includes a touch screen display, the zero client monitor (200) may include touchscreen capabilities without departing from the definition of a plain monitor defined above. For example, the touchscreen capabilities may still be utilized to adjust local display settings (e.g., brightness, contrast, picture mode, etc.) of the zero client monitor (200).

In one or more embodiments disclosed herein, the antenna (204) may be any combination of hardware devices including circuitry that enables the client monitor (200) to connect to a network (e.g., network 105, FIG. 1). For example, the antenna (204) may be an antenna array chip comprising a plurality of physical antennas, a radio frequency (RF) switch, and an RF mixer.

The plurality of physical antennas may be an antenna array adapted for wide coverage of the radio frequency spectrum (e.g., a Sub-6 GHz and mmWave antenna array). The RF switch may be any combination of hardware devices including circuitry adapted to implement a Time-Domain Division or Frequency Domain Division of the 5G network. The RF mixer may be any combination of hardware devices including circuitry (e.g., signal amplifiers, noise attenuators, etc.) adapted to execute beamforming and a multiple-input and multiple-output (MIMO) scheme of the 5G network. In one or more embodiments disclosed herein, the antenna array chip may be an integrated circuit (IC) including at least the RF switch and the RF mixer. For example, the antenna array chip may be a Qualcomm QTM527 mmWave Antenna Module. Additionally, in one or more embodiments disclosed herein, the zero client monitor may include multiple ones of the antenna array chip in order to execute beamforming and the MIMO scheme of the 5G network.

In one or more embodiments disclosed herein, the modem (206) may be any combination of hardware devices including circuitry that enables the client monitor (200) to connect to the network via the antenna (204). For example, the modem (206) may be any combination of hardware devices including circuitry adapted as a digital signal processor (DSP). The DSP may be adapted to execute 5G L1 protocols of the 5G network.

The modem (206) may be integrated (i.e., embedded) within the casing of the zero client monitor (200). Alternatively, the modem (206) may be provided outside the zero client monitor as a separate device adapted to be connected to (e.g., plugged into) a peripheral of the zero client monitor (200).

In one or more embodiments disclosed herein, the subscriber identity authentication card (208) may be any combination of hardware including circuitry adapted to contain identifiers for registering/authenticating the zero client monitor (200) with the network. For example, the subscriber identity authentication card (208) may be a subscriber identity module chip (i.e., SIMM card) adapted to be inserted into a port on the casing (201).

Alternatively, the subscriber identity authentication card (208) may be an embedded subscriber identity module (e-SIM) chip integrated within the casing (201). The subscriber identity authentication card (208) is utilized in combination with the antenna (204) and modem (206) to connect the zero client monitor (200) to the network.

In one or more embodiments disclosed herein, the processor (210) may be a System on a Chip (SoC). The SoC may include, all integrated on a single SoC, at least a central processing unit (CPU), an integrated memory (e.g., persistent memory, cache, etc.), and a universal serial bus (USB) controller adapted to receive user input from the input device(s) (216).

Alternatively, the processor (210) may be a PC over IP (PCoIP) chip adapted for implementing remote desktop (RDP) and PCoIP protocols to access a virtual machine (e.g., virtual machines (107A, 107N), FIG. 1) on the network. In one or more embodiments, when the processor (210) is a PCoIP chip, the display controller (202) is embedded on the PCoIP chip as video decoders.

The processor (210) communicates with the antenna (204) through the modem (206) to implement instructions for connecting the zero client monitor (200) to the network. The processor (210) may also host the 5G L2 protocol layer, the transport layer (TCP/IP), as well as the application layer in order to implement a zero client behavior (i.e., implementing RDP, an OS, USB drivers, etc.) on the zero client monitor (200).

The processor (210) may also be configured to store a virtual desktop interface (VDI) (212) protocol (i.e., programming code for implementing VDI) in the integrated memory (not shown) of the SoC or PCoIP. This VDI (212) protocol enables the zero client monitor (200) to access a VDI management system controlling the virtual machines on the network in order to implement RDP and/or PCoIP protocols on the zero client monitor (200).

In one or more embodiments disclosed herein, the switch (214) may be any combination of hardware devices including circuitry that enables the zero client monitor (200) to switch between different states. For example, the switch (214) may be a switching circuit connected on one end to a physical switch (e.g., a flip switch, a push button, etc.) and on the other end to the processor (210). The switch (214) may also include an indicator (e.g., a light, a mini LED screen, etc.) adapted to notify the user about the state of the zero client monitor (200).

In this example, the switch (214) may cause the processor (210) to switch between an activated state and a deactivated state. In the activated state, the processor (210) is powered such that the zero client monitor (200) is configured to operate as a zero client device.

In the deactivated state, the processor (210) is deactivated such that the zero client monitor (200) is configured to operate as a plain monitor with the display controller (202) controlling the display functions of the zero client monitor (200) independently from the processor (210). Said another way, all functions of the processor (210) are halted when the processor (210) is switched to the deactivated state.

In one or more embodiments disclosed herein, the input device(s) (216) may be a touchscreen, keyboard, mouse, microphone, touchpad, electronic pen, or any other type of input device. The input device(s) (216) may be used to transmit a user input to the processor (210) of the zero client monitor (200) in order to operate the zero client monitor (200) as a virtual computing machine when the processor (200) is switched to the activated state such that the zero client monitor (200) is configured as a zero client device.

Although several of the components of the zero client monitor (200) have been described as being adapted for a 5G network, one of ordinary skill in the art would appreciate that these components can be adapted for any type of network (e.g., 3rd Generation Partnership Project (3GPP), Long-Term Evolution (LTE), etc.).

Additionally, while the zero client monitor (200) has been illustrated as including a limited number of specific components, the zero client monitor (200) may include fewer, different, and/or additional components without departing from embodiments disclosed herein. For example, the zero client monitor (200) may further include convertors (e.g., analog-to-digital (ADC), digital-to-analog (DAC), etc.) to adapt the zero client monitor (200) for speech transmission to the virtual machines on the network. The above discussed components of the zero client monitor (200) may also be coupled to each other within the casing (201) in any combination to be able to communicate with one other to provide the above discussed functions.

Figure 3:
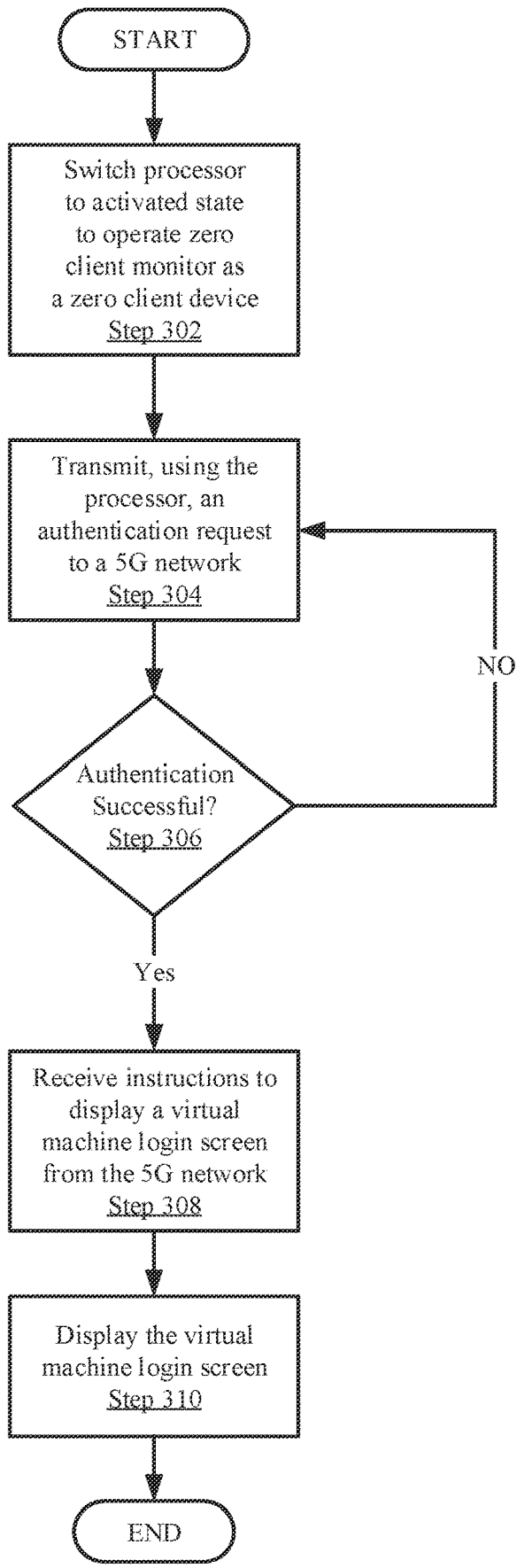
FIG. 3 shows a flowchart in accordance with one or more embodiments of the invention.

FIG. 3 shows a flowchart in accordance with one or more embodiments disclosed herein. The method may be performed by, for example, one or more components of a zero client monitor (e.g., 200, FIG. 2). Other entities may perform the method of FIG. 3 without departing from embodiments disclosed herein.

While the various steps in the flowchart shown in FIG. 3 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in time manner.

In Step 302, a processor (e.g., 210, FIG. 2) of the zero client monitor is switched to an activated state. This configures the zero client monitor to operate as a 5G zero client device.

In one or more embodiments disclosed, the processor of the zero client monitor is switched to an activated state through a user toggling a switch (e.g., 214, FIG. 2) from an OFF position to an ON position. The switch may be a physical switch (e.g., a flip switch, a push button, etc.) connected to the processor that supplies and/or cuts-off electrical power to the processor. When the switch is toggled to the ON position, an indicator (e.g., a light, a mini LED screen, etc.) connected to the switch notifies the user that the zero client monitor is operating as the 5G zero client device. Similarly, when the switch is toggled to the OFF position, the indicator connected to the switch notifies the user that the zero client monitor is operating as a plain In Step 304, the processor transmits an authentication request to a 5G network to authenticate the zero client monitor with the 5G network. The authentication request may include identification/authentication information (e.g., a user ID) unique to a subscriber identity authentication chip (e.g., 208, FIG. 2) installed in the zero client monitor and is transmitted by the processor to a computing device coupled to a base station (e.g., 103, FIG. 1) connected to the 5G network. The authentication request may be transmitted using a TCP/UDP-IP protocol.

In one or more embodiments disclosed herein, the zero client monitor is authenticated with the 5G network through the computing device of the base station matching the identification/authentication information included in the packet transmitted by the processor with a list of identification/authentication information stored in a user authentication database stored in the computing device of the base station.

In Step 306, the processor determines whether the authentication with the 5G network was successful. For example, after determining that the identification/authentication information transmitted by the processor matches an identification/authentication information stored in the user authentication database, the computing device of the base station transmits a data packet and/or a signal to the processor with information notifying the processor that the authentication was successful.

Additionally, if the computing device of the base station fails to find a matching identification/authentication information in the user authentication database, the base station transmits a data packet with information (e.g., a connection failure message, a connection attempt time-out message, etc.) notifying the processor that the authentication was unsuccessful. If the authentication with the 5G network was unsuccessful (i.e., NO in Step 306), the processor reattempts the authentication in Step 306 until the authentication attempt is cancelled by the user of the zero client monitor.

If the authentication with the 5G network was successful (i.e., YES in Step 306), the process proceeds to Step 308 where the processor receives instructions from the 5G network (e.g., from a VDI system hosting one or more virtual machines on the 5G network) to display a user log-in screen on the display screen of the zero client monitor.

In one or more embodiments disclosed herein, if the processor is a SoC, the instructions may be received as one or more data packets including commands that cause the processor to display the user log-in screen using the display controller (e.g., 202, FIG. 2) of the zero client monitor. If the processor is a PCoIP chip, the processor causes the integrated video decoders to display the log-in screen on the display screen of the zero client monitor.

The log-in screen may include a first space for the user to input a user identification (ID) (e.g., a user name, a unique user identification number, etc.) and a second space for the user to input a user-set password (e.g., a string of characters and numerals that allows access to the user's virtual machine (VM) executing on the VDI system. The user ID and password is received by the zero client monitor from the user through a keyboard connected to a USB port on the zero client monitor.

In Step 310, in response to receiving the instructions to display the user log-in screen, the processor causes the display controller of the zero client monitor to display the log-in screen to the user for the user to log into a virtual machine on the network. The instructions to display the user log-in screen may include a set of pixels or bitmaps that correspond to the user log-in screen.

In one or more embodiments disclosed herein, once the log-in screen is displayed on the display screen on the zero client monitor, the zero client monitor is operating as a terminal for accessing and operating a virtual machine (e.g., one of 107A to 107N, FIG. 1) operating on a computer device in communication with the 5G network. In particular, once the user is successfully logged into the virtual machine, any inputs from the user received through the peripheral devices connected to the zero client monitor will cause the virtual machine to execute the corresponding processes. In response to executing the corresponding processes, the virtual machine transmits sets of pixels or bitmaps corresponding to changes in the virtual desktop screen of the virtual machine to the zero client monitor.

Embodiments disclosed herein may provide the ability to directly connect a monitor configured as a zero client device to a 5G network. In other words, the monitor is totally integrated with 5G technologies by having all 5G-related components directly disposed within a casing of the monitor. By doing so, complex deployments requiring specific hardware (e.g., wireless routers, switches, Ethernet cables, etc.) can be avoided. Consequently, users of the zero client monitor of one or more embodiments may benefit from being able to use computer functions with basic/bare-minimum hardware.

Additionally, the zero client monitor of one or more embodiments is able to leverage the performance levels of the 5G network environment. For example, the 5G network provides the benefits of low latency (e.g., latency in milliseconds, such as under 20 ms to 3 ms, between a UE and a base station with theoretical achievable latencies of under 1 ms). The 5G network also supports transfer rates up to 20 Gbit/s, which is significantly faster than a Cat-7 Ethernet cables that only supports up to 1 Gbit/s under 100 m. Consequently, a user of the zero client monitor connected to a virtual machine on a network may benefit from these performances to attain an upgraded virtual machine work environment.

In particular, a human user requires a minimum of 0.1 seconds to perceive events such as a mouse click, a pointer movement, a window movement or resizing, a keypress, a button press, a drawing gesture, or other user interface (UI) inputs involving hand eye coordination. The processing capabilities of the 5G network enable transfer rates at speeds (e.g., 20 Gbit/s) capable of preventing delays in the user's perception of such user interface (UI) inputs involving hand eye coordination when a user accesses a virtual machine through the zero client monitor of one or more embodiments.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A monitor comprising:
   a casing comprising a display;
   a display controller disposed within the casing and that controls the display;
   a processor disposed within the casing that controls the display and communicates with a fifth generation (5G) network;
   a 5G antenna that connects the monitor to the 5G network; and
   a switch that switches the processor between an activated state and a deactivated state, wherein the monitor is a zero-client system when the processor is in the activated state in which the processor authenticates the monitor with the 5G network, and a plain monitor when the processor is in the deactivated state in which the display controller independently controls the display without the processor.

2. The monitor of claim 1, wherein the monitor further comprises:
   a modem that communicates with and executes protocols of the network, wherein the processor communicates with the 5G network through the modem and the 5G antenna; and
   an authentication chip configured for authenticating a user with the 5G network.

3. The monitor of claim 2, wherein the authentication chip is a subscriber identity module chip (SIMM card) or an embedded subscriber identity module (e-SIM) chip.

4. The monitor of claim 2, wherein the 5G antenna is a 5G antenna array chip comprising:

a plurality of physical antennas for communicating with the 5G network;
a radio frequency (RF) switch that executes a Time-Domain Division or Frequency-Domain Division of the 5G network; and
an RF mixer that executes beamforming and a multiple-input and multiple-output (MIMO) scheme of the 5G network.

5. The monitor of claim 1, wherein the 5G antenna array chip connects the monitor to an edge station of the 5G network.

6. The monitor of claim 1, wherein the processor stores and executes a virtual desktop infrastructure (VDI) that configures a virtual desktop environment on the monitor when the monitor is configured as the zero-client system.

7. The monitor of claim 1, wherein the processor is a System on a Chip (SoC) that converts the monitor into the zero client system.

8. The monitor of claim 1, wherein the display controller is a stripped-down graphics card or a PC over IP (PCoIP) chip.

9. The monitor of claim 8, wherein the processor and the display controller are embedded in a single PCoIP SoC chip.

10. A method for operating a monitor, the method comprising:
switching, by operating a switch on the monitor, a processor of the monitor between a deactivated state and an activated state, wherein the monitor is a zero-client system when the processor is in the activated state and a plain monitor when the processor is in the deactivated state in which the display controller independently controls the display without the processor;
causing, by the processor and in response to being switched to the activated state, an authentication chip of the monitor to authenticate the monitor with a fifth generation (5G) network;
receiving, by the processor through a modem connected to a 5G antenna, instructions to display a virtual machine login on the monitor; and
causing, by the processor and using the instructions, the display controller of the monitor to display the virtual machine login on the display.

* * * * *